United States Patent
Wu et al.

(10) Patent No.: US 10,635,332 B2
(45) Date of Patent: Apr. 28, 2020

(54) MANAGING DATA STORAGE ARRAYS ON BEHALF OF HOST COMPUTERS VIA SPECIALIZED LUN-RELATED QUERIES

(71) Applicant: EMC IP Holding Company LLC, Hopkinton, MA (US)

(72) Inventors: Bo Wu, Shanghai (CN); Guangliang Lei, Shanghai (CN); Cynthia Burns, Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 261 days.

(21) Appl. No.: 15/796,976

(22) Filed: Oct. 30, 2017

(65) Prior Publication Data

US 2019/0129628 A1 May 2, 2019

(51) Int. Cl.
*G06F 3/06* (2006.01)

(52) U.S. Cl.
CPC ............ *G06F 3/0619* (2013.01); *G06F 3/061* (2013.01); *G06F 3/067* (2013.01); *G06F 3/0614* (2013.01); *G06F 3/0632* (2013.01); *G06F 3/0665* (2013.01); *G06F 3/0685* (2013.01); *G06F 3/0689* (2013.01); *G06F 3/0649* (2013.01)

(58) Field of Classification Search
CPC .... G06F 3/0619; G06F 3/0665; G06F 3/0689; G06F 3/067; G06F 3/0685; G06F 3/0649; G06F 3/061; G06F 3/0614; G06F 3/0632
See application file for complete search history.

(56) References Cited

U.S. PATENT DOCUMENTS

| | | | | |
|---|---|---|---|---|
| 7,461,202 B2* | 12/2008 | Forrer, Jr. | ........... | G06F 12/0866 711/113 |
| 8,239,584 B1 | 8/2012 | Rabe et al. | | |
| 8,595,535 B1 | 11/2013 | Tamilarasan et al. | | |
| 8,880,801 B1* | 11/2014 | Robins | ................ | G06F 12/0246 711/114 |
| 8,949,483 B1* | 2/2015 | Martin | .................. | G06F 3/0653 710/15 |
| 8,972,340 B1* | 3/2015 | Haase | .................... | G06F 16/113 707/609 |
| 8,977,826 B1* | 3/2015 | Meiri | .................. | G06F 11/2066 711/159 |
| 9,047,352 B1* | 6/2015 | Dong | .................... | G06F 16/144 |

(Continued)

*Primary Examiner* — Ramon A. Mercado
(74) *Attorney, Agent, or Firm* — BainwoodHuang (57) ABSTRACT

Data storage federation equipment manages data storage arrays on behalf of host computers. In particular, the data storage federation equipment provides media type queries to the data storage arrays, each media type query requesting media type identification for a particular logical unit of storage (LUN) on a particular data storage array. The data storage federation equipment further receives, in response to the media type queries, media type responses from the data storage arrays, each media type response identifying media type for a particular LUN on a particular data storage array. The data storage federation equipment further performs, based on the media type responses, memory management operations that adjust operation of LUNs on the data storage arrays on behalf of the host computers. The memory management operations are performed while the data storage federation equipment remains interconnected between the host computers and the data storage arrays.

20 Claims, 5 Drawing Sheets

(56) References Cited

U.S. PATENT DOCUMENTS

| | | | |
|---|---|---|---|
| 9,063,661 B1* | 6/2015 | Raizen | G06F 3/0611 |
| 9,141,305 B2 | 9/2015 | Tylik et al. | |
| 9,405,583 B2* | 8/2016 | Polkovnikov | G06F 3/0631 |
| 9,459,809 B1* | 10/2016 | Chen | G06F 3/0644 |
| 9,478,274 B1* | 10/2016 | Michaud | G11C 11/40607 |
| 9,569,268 B2 | 2/2017 | Alexeev et al. | |
| 9,626,116 B1 | 4/2017 | Martin et al. | |
| 9,703,664 B1 | 7/2017 | Alshawabkeh et al. | |
| 9,940,033 B1 | 4/2018 | Alshawabkeh et al. | |
| 9,946,465 B1 | 4/2018 | Martin et al. | |
| 9,965,218 B1 | 5/2018 | Martin et al. | |
| 2010/0138627 A1* | 6/2010 | Ossia | G06F 3/0619 |
| | | | 711/171 |
| 2010/0299489 A1* | 11/2010 | Balachandriah | G06F 11/3442 |
| | | | 711/162 |
| 2012/0297156 A1* | 11/2012 | Suzuki | G06F 3/0607 |
| | | | 711/162 |

* cited by examiner

MANAGING DATA STORAGE ARRAYS ON BEHALF OF HOST COMPUTERS VIA SPECIALIZED LUN-RELATED QUERIES

BACKGROUND

A conventional storage virtualization system in communication with multiple data storage arrays is able to present logical units of storage (LUNs) from these arrays to a computerized host device. In such a situation, the computerized host device perceives the LUNs as residing at the conventional storage virtualization system rather than residing at their actual array locations which may be remote from the conventional storage virtualization system.

With such infrastructure in place, the computerized host device is able to send input/output (I/O) requests to the conventional storage virtualization system rather than directly to the arrays. The conventional storage virtualization system then communicates with one or more of the arrays to process the I/O requests in a manner that is transparent to the computerized host device.

SUMMARY

Unfortunately, there are deficiencies to the above-described conventional storage virtualization system. Along these lines, the types of operations that the conventional storage virtualization system can perform is limited. For example, the conventional storage virtualization system may not know whether a particular logical unit of storage (LUN) on a data storage array includes solid state drive (SSD) memory, Serial Attached Small Computer System Interface (SAS) memory, near-line SAS memory, or multiple storage tiers. Moreover, if the LUN at a particular array is provisioned with memory from multiple storage tiers, the conventional storage virtualization system still does not know which tiering policy the array applies to that LUN.

Other deficiencies exist as well. For example, the conventional storage virtualization system does not know whether each LUN is thickly provisioned (e.g., provisioned with actual storage) or thinly provisioned (e.g., where a large range of storage space is represented as being available but where actual storage is allocated to that LUN in real-time as needed).

Accordingly, if a human operator wishes to understand these details, the human operator must access each data storage array individually (e.g., manually, one at a time). Furthermore, if the human operator wishes to make an adjustment (e.g., change a tiering policy, unmap storage to free up unused space, etc.) the human operator must enter such control directly on each individual data storage array since the conventional storage virtualization system lacks such visibility and control.

In contrast to the above-described conventional storage virtualization system which is limited in its ability to view particular LUN details and thus exercise enhanced LUN control, improve techniques are directed to managing data storage arrays on behalf of host computers via specialized queries such as media type queries that determine the media type (or types) of various LUNs provided by the data storage arrays. Such additional information enables a central access point to provide effective and efficient LUN control remotely from the data storage arrays, e.g., from federation equipment that is interconnected between the host computers and the data storage arrays, from the host computers themselves, etc. In some arrangements, the federation equipment may be configured to carry out various LUN-related operations automatically, e.g., provide an unmap command to unmap no longer used storage when detecting that remaining LUN capacity has dropped below a predefined threshold. Such central access point operation alleviates the need for a human operator to access multiple data storage arrays individually and directly thus making management of the data storage arrays less burdensome and less prone to error.

One embodiment is directed to a method that is performed in data storage federation equipment that is interconnected between a set of host computers and a set of data storage arrays. The method manages the set of data storage arrays on behalf of the set of host computers. The method includes providing a set of media type queries to the set of data storage arrays, each media type query requesting media type identification for a particular LUN on a particular data storage array. The method further includes receiving, in response to the set of media type queries, a set of media type responses from the set of data storage arrays, each media type response identifying media type for a particular LUN on a particular data storage array. The method further includes performing, based on the set of media type responses, a set of memory management operations that adjusts operation of a set of LUNs on the set of data storage arrays on behalf of the set of host computers. The set of memory management operations are performed while the data storage federation equipment remains interconnected between the set of host computers and the set of data storage arrays.

In some arrangements, providing the set of media type queries to the set of data storage arrays includes:
  (i) sending a first media type query from the data storage federation equipment to a first data storage array to question the first data storage array as to whether a first LUN on the first data storage array occupies any solid state drive (SSD) memory and any hard disk drive (HDD) memory, and
  (ii) sending a second media type query from the data storage federation equipment to a second data storage array to question the second data storage array as to whether a second LUN on the second data storage array occupies any SSD memory and any HDD memory.

In some arrangements, receiving the set of media type responses from the set of data storage arrays includes:
  (i) obtaining a first media type response from first data storage array in response to the first media type query, the first media type response indicating whether the first LUN on the first data storage array occupies any SSD memory and any HDD memory, and
  (ii) obtaining a second media type response from second data storage array in response to the second media type query, the second media type response indicating whether the second LUN on the second data storage array occupies any SSD memory and any HDD memory.

In some arrangements, the method further includes:
  (i) based on the first media type response, transmitting a first message to a first host computer indicating whether the first LUN on the first data storage array occupies any SSD memory and any HDD memory; and
  (ii) based on the second media type response, transmitting a second message to a second host computer indicating whether the second LUN on the second data storage array occupies any SSD memory and any HDD memory.

In some arrangements, the first media type response indicates that the first LUN on the first data storage array occupies SSD memory and HDD memory. In these arrangements, the second media type response indicates that the second LUN on the second data storage array occupies SSD memory and HDD memory. Here, the method further includes:

(i) sending a first tiering policy query from the data storage federation equipment to the first data storage array to ascertain a current tiering policy that the first data storage array applies to the first LUN, and (ii) sending a second tiering policy query from the data storage federation equipment to the second data storage array to ascertain a current tiering policy that the second data storage array applies to the second LUN.

In some arrangements, the method further includes:

(i) providing a first tiering policy command that directs the first data storage array to apply a new tiering policy to the first LUN in place of the current tiering policy that the first data storage array applies to the first LUN, and (ii) providing a second tiering policy command that directs the second data storage array to apply a new tiering policy to the second LUN in place of the current tiering policy that the second data storage array applies to the second LUN.

In some arrangements, the method further includes:

(i) prior to providing the first tiering policy command, receiving a first tiering policy instruction from a first host computer, the first tiering policy instruction directing the data storage federation equipment to provide the first tiering policy command to the first data storage array, and (ii) prior to providing the second tiering policy command, receiving a second tiering policy instruction from a second host computer, the second tiering policy instruction directing the data storage federation equipment to provide the second tiering policy command to the second data storage array.

In some arrangements, the first media type response indicates that the first LUN on the first data storage array occupies SSD memory. Additionally, the second media type response indicates that the second LUN on the second data storage array occupies SSD memory. Also, the method further includes:

(i) sending a first SSD caching query from the data storage federation equipment to the first data storage array to ascertain whether the first data storage array is currently using a portion of flash memory as an extension of a cache that buffers data for the first LUN, and (ii) sending a second SSD caching query from the data storage federation equipment to the second data storage array to ascertain whether the second data storage array is currently using a portion of flash memory as an extension of a cache that buffers data for the second LUN.

In some arrangements, a first SSD caching response to the first SSD caching query indicates that the first data storage array is currently not using a portion of flash memory as an extension of a cache that buffers data for the first LUN. Furthermore, a second SSD caching response to the second SSD caching query indicates that the second data storage array is currently not using a portion of flash memory as an extension of a cache that buffers data for the second LUN. Additionally, the method further includes:

(i) sending a first SSD caching command from the data storage federation equipment to the first data storage array that directs the first data storage array to use a portion of flash memory as an extension of a cache that buffers data for the first LUN, and (ii) sending a second SSD caching command from the data storage federation equipment to the second data storage array that directs the second data storage array to use a portion of flash memory as an extension of a cache that buffers data for the second LUN.

In some arrangements, the method further includes:

(i) based on the first SSD caching response, transmitting a first message to a first host computer indicating that the first data storage array is currently not using a portion of flash memory as an extension of the cache that buffers data for the first LUN, (ii) prior to sending the first SSD caching command, receiving a first SSD caching instruction from the first host computer, the first SSD caching instruction directing the data storage federation equipment to provide the first tiering policy command to the first data storage array, (iii) based on the second SSD caching response, transmitting a second message to a second host computer indicating that the second data storage array is currently not using a portion of flash memory as an extension of the cache that buffers data for the first LUN, and (iv) prior to sending the second SSD caching command, receiving a second SSD caching instruction from the second host computer, the second SSD caching instruction directing the data storage federation equipment to provide the second tiering policy command to the second data storage array.

In some arrangements, a first media type response indicates that a first LUN on a first data storage array is a thinly provisioned LUN, and a second media type response indicates that a second LUN on a second data storage array is a thinly provisioned LUN. Additionally, the method further includes:

(i) based on the first media type response, sending a first unmap command from the data storage federation equipment to the first data storage array to unmap unused storage slices from the first LUN and return the unused storage slices back to a pool of free storage slices on the first data storage array, and (ii) based on the second media type response, sending a second unmap command from the data storage federation equipment to the second data storage array to unmap unused storage slices from the second LUN and return the unused storage slices back to a pool of free storage slices on the second data storage array.

In some arrangements, the method further includes:

(i) based on the first media type response, transmitting a first message to a first host computer indicating that the first LUN on the first data storage array is a thinly provisioned LUN, (ii) prior to sending the first unmap command, receiving a first unmap instruction from the first host computer, the first unmap instruction directing the data storage federation equipment to provide the first unmap command to the first data storage array, (iii) based on the second media type response, transmitting a second message to a second host computer indicating that the second LUN on the second data storage array is a thinly provisioned LUN, and (iv) prior to sending the second unmap command, receiving a second unmap instruction from the second host computer, the first unmap instruction directing the data storage federation equipment to provide the second unmap command to the second data storage array.

In some arrangements, the method further includes:
(i) based on the first media type response, performing a first capacity operation which determines whether an amount of remaining capacity of the first LUN is less than a first predefined capacity threshold, the first unmap command being sent to the first data storage array in response to a result of the first capacity operation indicating that the amount of remaining capacity of the first LUN is less than the first predefined threshold, and
(ii) based on the second media type response, performing a second capacity operation which determines whether an amount of remaining capacity of the second LUN is less than a second predefined capacity threshold, the second unmap command being sent to the second data storage array in response to a result of the second capacity operation indicating that the amount of remaining capacity of the second LUN is less than the second predefined threshold.

In some arrangements, the data storage federation equipment includes (i) cache memory and (ii) a communications interface that is constructed and arranged to communicate with the set of host computers and the set of data storage arrays via a storage area network (SAN)-based protocol. Here, the method further includes caching, through the communications interface and within the cache memory, host input/output (I/O) requests en route via the SAN-based protocol from the set of host computers to the set of data storage arrays.

Another embodiment is directed to data storage equipment which includes a host interface operative to communicate with a set of host computers, a storage interface operative to communicate with a set of data storage arrays, memory, and control circuitry coupled to the host interface, the storage interface, and the memory. The memory stores instructions which, when carried out by the control circuitry, cause the control circuitry to:
(A) provide a set of media type queries to the set of data storage arrays through the storage interface, each media type query requesting media type identification for a particular logical unit of storage (LUN) on a particular data storage array,
(B) in response to the set of media type queries, receive a set of media type responses from the set of data storage arrays through the storage interface, each media type response identifying media type for a particular LUN on a particular data storage array, and
(C) based on the set of media type responses, perform a set of memory management operations that adjusts operation of a set of LUNs on the set of data storage arrays on behalf of the set of host computers, the set of memory management operations being performed while the data storage federation equipment remains interconnected between the set of host computers through the host interface and the set of data storage arrays through the storage interface to process host input/output (I/O) requests.

Yet another embodiment is directed to a computer program product having a non-transitory computer readable medium which stores a set of instructions to manage a set of data storage arrays on behalf of a set of host computers. The set of instructions, when carried out by computerized circuitry, causes the computerized circuitry to perform a method of:
(A) providing a set of media type queries to the set of data storage arrays, each media type query requesting media type identification for a particular logical unit of storage (LUN) on a particular data storage array;
(B) in response to the set of media type queries, receiving a set of media type responses from the set of data storage arrays, each media type response identifying media type for a particular LUN on a particular data storage array; and
(C) based on the set of media type responses, performing a set of memory management operations that adjusts operation of a set of LUNs on the set of data storage arrays on behalf of the set of host computers, the set of memory management operations being performed while the data storage federation equipment remains interconnected between the set of host computers and the set of data storage arrays to process host input/output (I/O) requests.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in managing a set of data storage arrays on behalf of a set of host computers via specialized queries such as media type queries that determine the media type of various LUNs provided by the set of data storage arrays.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to managing data storage arrays on behalf of host computers via specialized queries such as media type queries that determine the media type of various logical units of storage (LUNs) provided by the data storage arrays. Such additional LUN information enables a central access point to provide effective and efficient LUN control remotely from the data storage arrays, e.g., from federation equipment interconnected between the host computers and the data storage arrays. In some arrangements, the federation equipment may be configured to carry out various LUN-related operations automatically, e.g., provide an unmap command to free up no-longer-used storage when determining that remaining LUN capacity has dropped below a predefined threshold. Such central access point operation alleviates the need for a human operator to access multiple data storage arrays individually and directly thus making management of the data storage arrays less burdensome and less prone to error.

Figure 1:
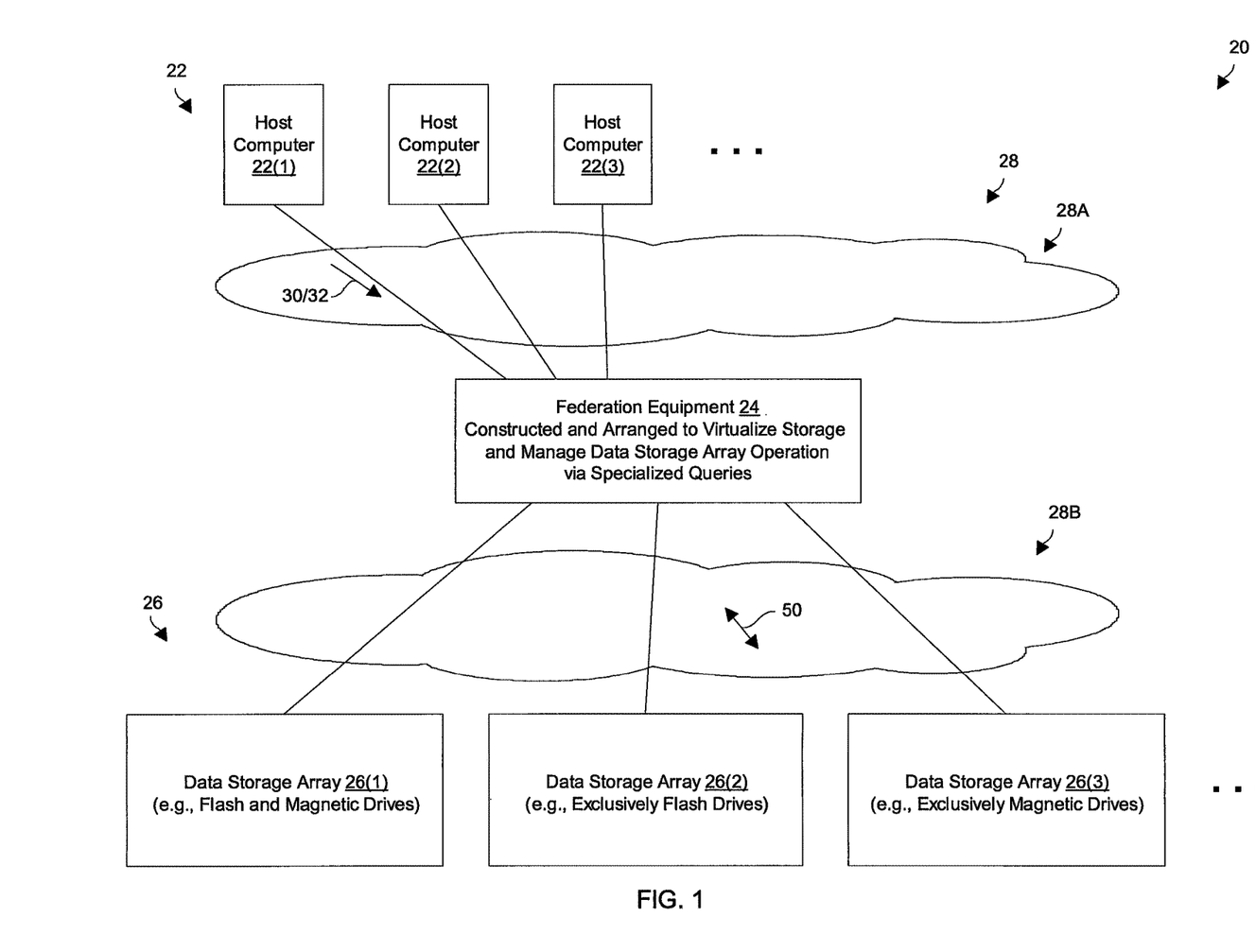
FIG. 1 is a block diagram of a data storage environment which includes federation equipment that manages data storage arrays on behalf of host computers via specialized queries in accordance with certain example embodiments.

FIG. 1 shows a data storage environment 20 which includes federation equipment that manages data storage array operation on behalf of host computers via specialized queries in accordance with certain example embodiments. The data storage environment 20 includes host computers 22(1), 22(2), 22(3), . . . (collectively, host computers 22), electronic federation equipment 24, data storage arrays 26(1), 26(2), 26(3), . . . (collectively, arrays 26), and communications media 28(A), 28(B) (collectively, communications media 28).

The host computers 22 are constructed and arranged to perform useful work. For example, the host computers 22 may operate as file servers, web servers, email servers, enterprise servers, specialized servers, combinations thereof, and so on, which provide input/output (I/O) requests 30 (e.g., small computer system interface or SCSI commands) to the federation equipment 24 to store data 32 into and read data 32 from the data storage arrays 26.

The federation equipment 24 is constructed and arranged to virtualize storage on the data storage arrays 26. In particular, the federation equipment 24 presents actual LUNs on the arrays 26 as virtual volumes or objects (e.g., virtual disks) to the host computers 22. Accordingly, the host computers 22 are able to communicate with the federation equipment 24 as if the federation equipment 24 is a storage array. In some arrangements, the federation equipment 24 may be formed by multiple individual devices/appliances which are configured as a cluster.

The data storage arrays 26 are actual physical array equipment (e.g., collections of solid state devices, magnetic disk drives, combinations thereof, etc.) that store the data 32. Each data storage array 26 may create and maintain one or more physical LUNs 40 on one or more local sets of storage devices 42, e.g., in a local fast tier of solid state drive (SSD) memory, in a local medium speed tier of serial attached SCSI (SAS) drives, and in a local cost effective tier of near-line SAS drives, in combinations thereof, etc.

It should be understood that the arrays 26 may be differently provisioned with different storage media. For example, the array 26(1) may include both flash and magnetic storage devices, the array 26(2) may include only flash devices, the array 26(3) may include only magnetic storage devices, and so on.

The communications medium 28 includes portions 28A, 28B and is constructed and arranged to connect the various components of the data storage environment 20 together to enable these components to exchange electronic signals 50 (e.g., see the double arrow 50) such as storage-based signals, network-based signals, combinations thereof, etc. At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting SAN-based communications, LAN-based communications, cellular communications, combinations thereof, etc.

In some arrangements, both the communications medium 28A and the communications medium 28B carry block-based communications (e.g., SCSI). In other arrangements, both the communications medium 28A and the communications medium 28B carry TCP/IP-based communications (e.g., iSCSI). In yet other arrangements, the communications medium 28A carries IP-based communications while the communications medium 28B carries block-based communications. Other combinations and/or configurations are suitable for use as well such as both portions 28A, 28A carrying both types of communications.

During operation, the host computers 22 send I/O requests 30 to the federation equipment 24 for processing. Such I/O requests 30 may direct the federation equipment 24 to read host data 32 from a particular LUN on a particular data storage array 26, write host data 32 to a particular LUN 40 on a particular data storage array 26, and so on. During such operation, the actual location or locations of the host data 32 may be unknown to the host computers 22 (e.g., communications between the federation equipment 24 and the data storage arrays 26 may be transparent to the host computers 22).

During such operation, the federation equipment 24 is further able to query the data storage arrays 26 for certain information as well as provide commands to the data storage array 26 to adjust location operation on the arrays 26 based on that information. Along these lines, the federation equipment 24 is able to query each array 26 regarding LUNs that are presented from that array 26. For example, for a particular LUN on an array 26, the federation equipment 24 is able to query the array 26 to determine whether the LUN resides on a SSD tier, a SAS tier, a near-line SAS tier, or multiple tiers.

Moreover, for a LUN that resides on multiple tiers and has data initially positioned and/or relocated among the tiers based on a current tiering policy, the federation equipment 24 is able to query the array 26 that maintains that LUN for a description of the current tiering policy as well as change the current tiering policy to a new tiering policy if desired.

Example tiering policies include a highest available tier policy, an auto-tier policy, a start high then auto-tier policy, a lowest available tier policy, and a no data movement policy. Other tiering policies are suitable for use as well.

Under a highest available tier policy, the array 26 initially places the hottest data slices (e.g., uniformly sized amounts of host data) in the highest available tier until that tier's performance capacity is met. Such a policy is well suited for applications in which response time is a priority.

Under an auto-tier policy, the array 26 moves a small percentage of the most active data slices to the higher tiers while maintaining the rest of the data slices in lower tiers. The array 26 may relocated data slices to the most appropriate tier based on the activity level of each data slice.

Under a start high then auto-tier policy, the array 26 sets the preferred tier for initial data slice placement to the highest tier. After the array 26 has operated for some time, the array 26 transitions to auto-tiering, i.e., relocates data slices based on activity levels of the data slices.

Under a lowest available tier policy, the array 26 initially places data slices on the lowest available (or most cost effective) tier that has capacity. The array 26 then maintains the data slices on that tier regardless of activity level.

Under a no data movement policy, the array 26 maintains data slices in their current positions. The array 26 nevertheless collects statistics on the data slices so that if the tiering policy is later changed, the data slices may be relocated based on the collected statistics.

It should be understood that the federation equipment 24 is able to query the arrays 26 for other information as well such as LUN type (e.g., thick, thin, direct, etc.), the percentage of the LUN assigned to each tier, whether the array 26 (or LUNs of the array 26) have extended cache memory to a portion of an SSD tier, and so on. Moreover, the federation equipment 24 is able to analyze this information to identify particular events such as detecting a low available storage situation based on comparing certain LUN details to a predefined threshold. In certain situations, the federation equipment 24 can be configured to automatically send an unmap command to an array 26 when a LUN metric crosses such a threshold in order to free up slice locations for subsequent use (e.g., to replenish slice locations back to a pool for future allocation to a thinly provisioned LUN). Further details will now be provided with reference to FIG. 2.

Figure 2:
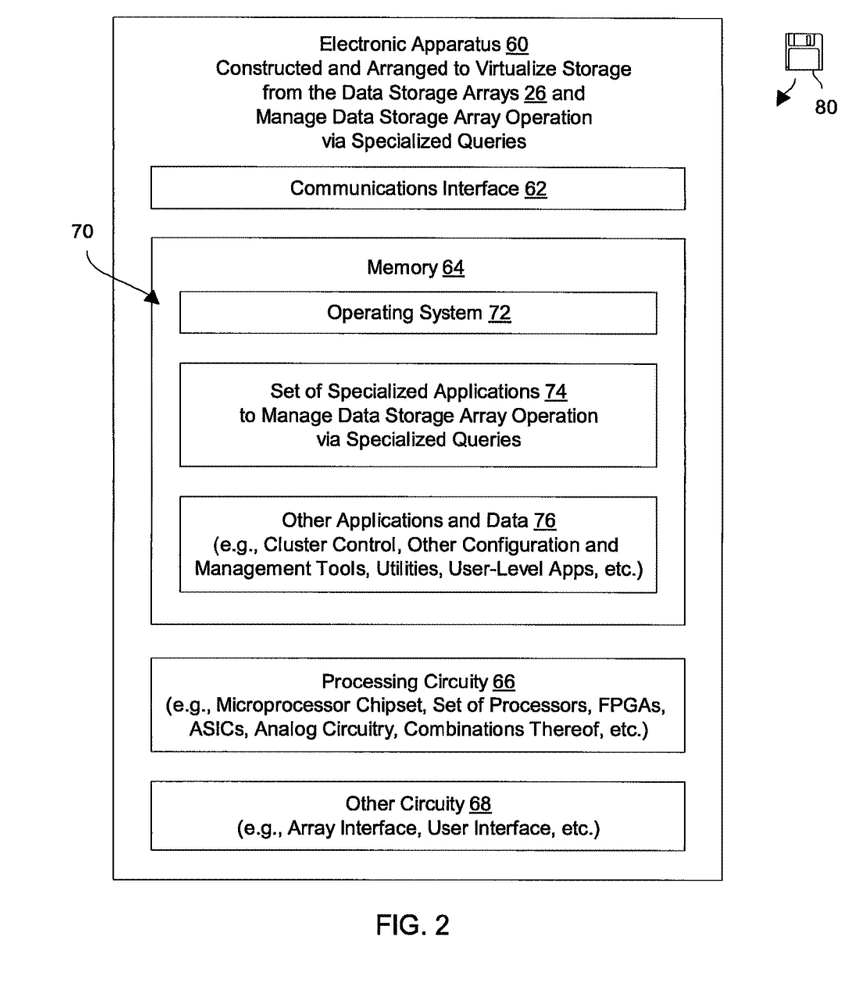
FIG. 2 is a block diagram of an apparatus which is suitable for use as the federation equipment of FIG. 1 in accordance with certain example embodiments.

FIG. 2 shows particular details of an electronic apparatus 60 which is suitable for use as at least a portion of the federation equipment 24 (FIG. 1) that virtualizes storage from the data storage arrays 26 as well as manages data storage array operation via specialized queries. In some arrangements, the federation equipment 24 may be formed by multiple storage devices (or appliances) configured as a cluster. Additionally, in some arrangements, the federation equipment 24 may be located remotely from one or more of the data storage arrays 26 but nevertheless operate as a central access point from the perspectives of host computers 22 (also see FIG. 1). As shown in FIG. 2, the federation equipment 60 includes a communications interface 62, memory 64, processing circuitry 66, and other circuitry 68.

The communications interface 62 is constructed and arranged to connect the electronic apparatus 60 to the communications medium 28 (also see FIG. 1) to enable communications with other devices of the data storage environment 20 (e.g., the host computers 22, the data storage arrays 26, etc.). Such communications may be IP-based, SAN-based, cellular-based, cable-based, fiber-optic based, wireless, combinations thereof, and so on. Accordingly, the communications interface 62 enables the electronic apparatus 60 to robustly and reliably communicate with other external apparatus.

The memory 64 is intended to represent both volatile storage (e.g., DRAM, SRAM, etc.) and non-volatile storage (e.g., flash memory, magnetic memory, etc.). The memory 64 stores a variety of software constructs 70 including an operating system 72 to manage resources of the electronic apparatus 60 (e.g., processor cycles, memory space, etc.), a set of specialized applications 74 (e.g., code for virtualizing storage from the data storage arrays 26 as well as querying the arrays 26 for detailed LUN/flash/etc. information and performing operations based on such information), and other applications and data 76 (e.g., code to coordinate operation with other electronic apparatus 60 in a clustered formation, other data storage configuration and management tools, administrative utilities, other data storage and/or user-level applications, and so on). The memory 64 may also operate as a cache for host data 32 that is en route between the host computers 22 and the arrays 26.

The processing circuitry 66 is constructed and arranged to operate in accordance with the various software constructs 70 stored in the memory 64. The processing circuitry 66 may include one or more physical storage processors or engines, data movers, director boards, blades, I/O modules, storage drive controllers, switches, other hardware, combinations thereof, and so on. As will be explained in further detail shortly, the processing circuitry 66 executes the set of specialized applications 74 to form specialized control circuitry that virtualizes storage and queries the arrays 26 for special information. Such processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the electronic apparatus 60. In particular, the computer program product 80 has a non-transitory (or non-volatile) computer readable medium which stores a set of instructions which controls one or more operations of the electronic apparatus 60. Examples of suitable computer readable storage media include tangible articles of manufacture and apparatus which store instructions in a non-volatile manner such as CD-ROM, flash memory, disk memory, tape memory, and the like.

The other circuitry 68 represents additional hardware. For example, the other circuitry 68 may include a user terminal or service processor that enables a human user to control and/or configure the federation equipment 24, and so on.

During operation, the electronic apparatus 60 performs useful work by providing a variety of data storage system services. Along these lines, the electronic apparatus 60 virtualizes storage on the data storage arrays 26. In particular, the electronic apparatus 60 presents actual LUNs 40 on the arrays 26 as virtual volumes to the host computers 22. Accordingly, the host computers 22 are able to send host I/O requests 30 to the electronic apparatus 60 as if the electronic apparatus 60 was a storage array with local storage. In turn, the electronic apparatus 60 can satisfy the host I/O requests 30 perhaps with participation of one or more of the data storage arrays 26 (e.g., process a host I/O request 30 via a particular data storage array 26, process a host I/O request 30 from a local cache of the electronic apparatus 60, etc.).

During such operation, the electronic apparatus 60 may query the data storage arrays 26 for certain information that enables electronic apparatus 60 (and perhaps the host computers 22) to adjust data storage array operation without need to directly access each data storage array 26 individually and directly. That is, rather than require a human operator to manually connect to each data storage array 26 which would require significant time and effort, the electronic apparatus 60 operates as a central access point. Accordingly, from one location, the data storage arrays 26 may be monitored (e.g., queried for media type(s) for each LUN, tiering policy for each LUN, etc.). Likewise, from that one location, the data storage arrays 26 may be controlled (e.g., to change tiering policy for a LUN, to extend a cache to include a portion of an SSD tier, etc.). Further details will now be provided with reference to FIGS. 3 and 4.

Figure 3:
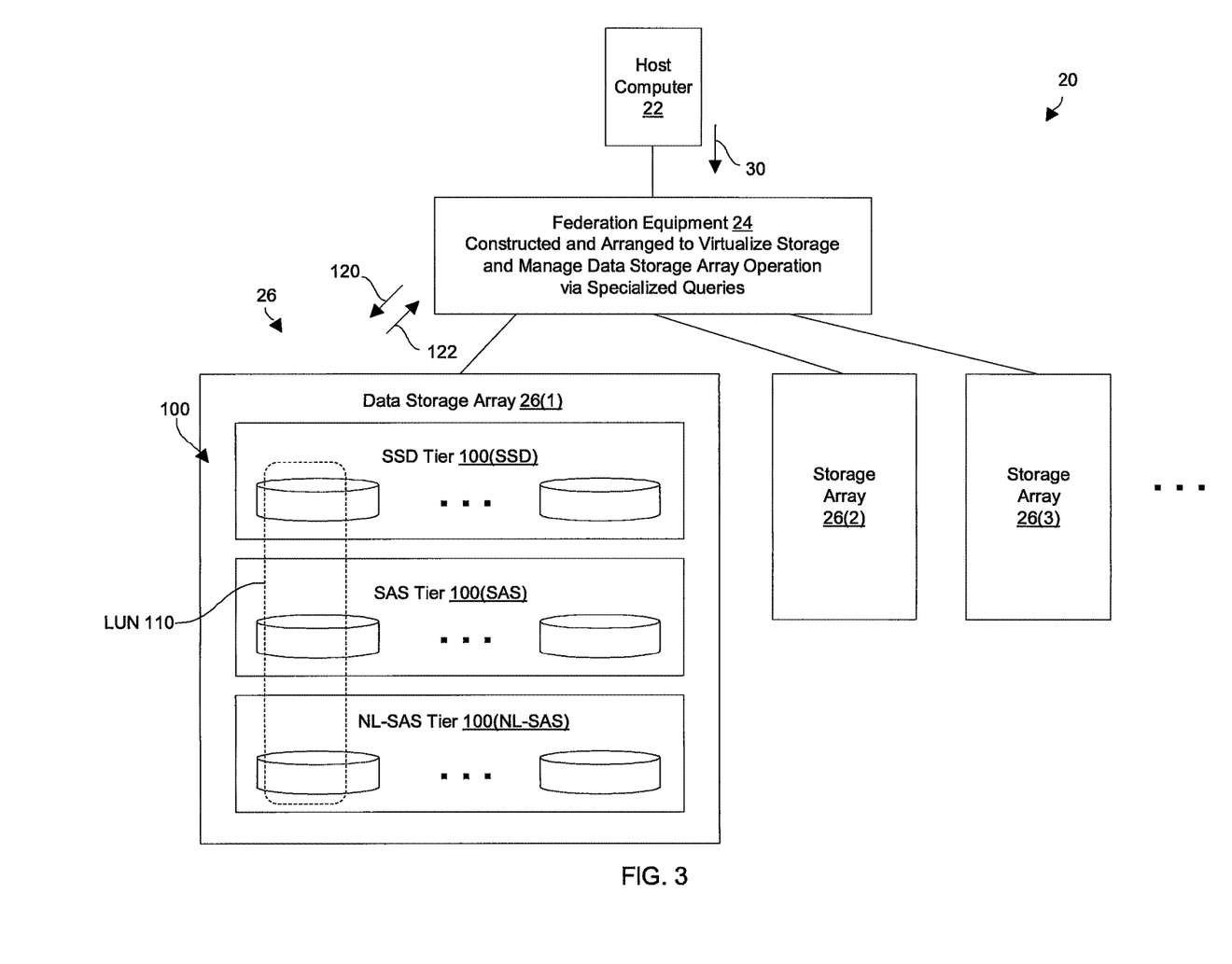
FIG. 3 is a block diagram illustrating particular operating details of the federation equipment.
Figure 4:
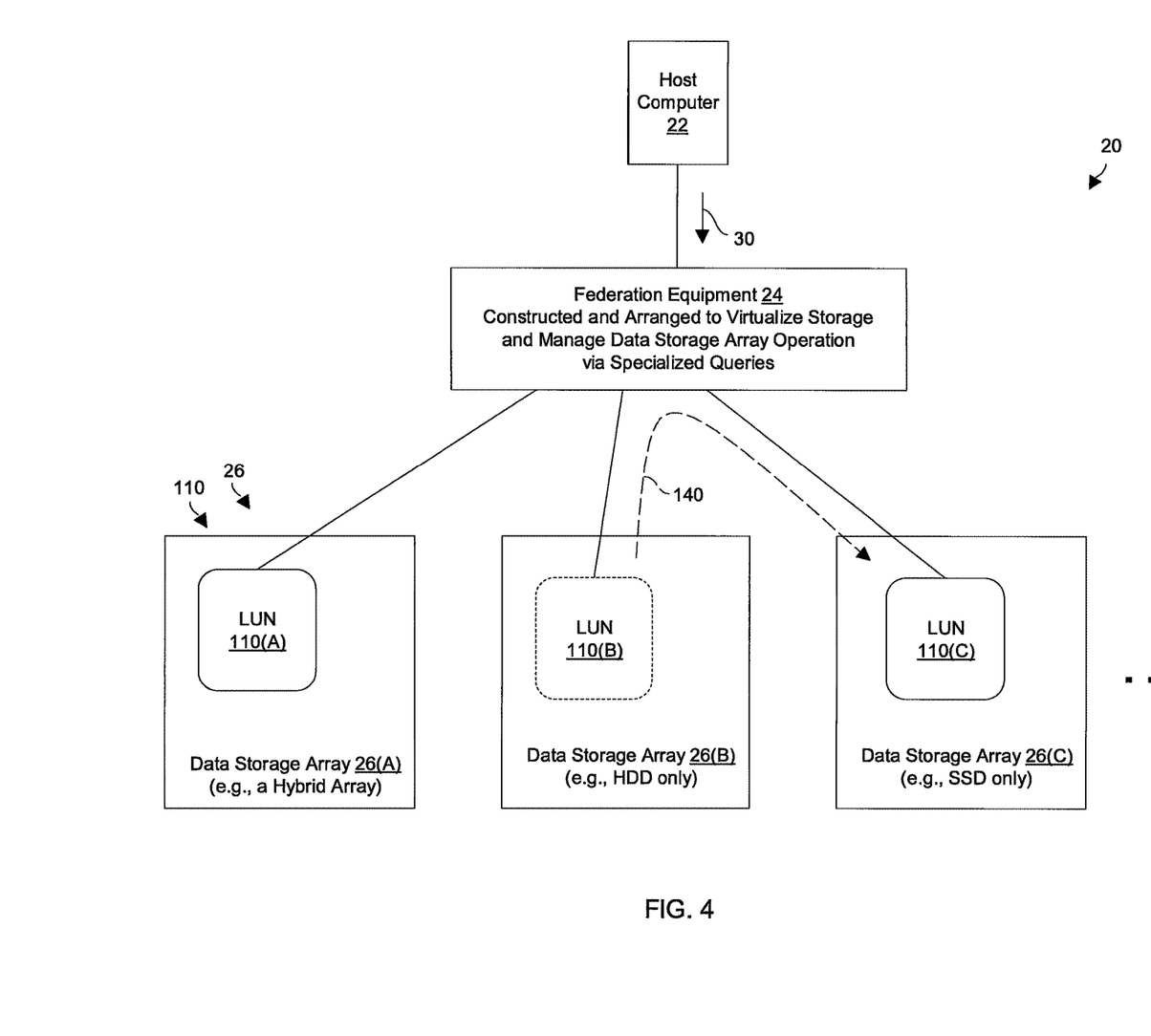
FIG. 4 is a block diagram illustrating further operating details of the federation equipment.

FIGS. 3 and 4 show, by way of example only, certain operating details for the federation equipment 24 (also see FIG. 1). FIG. 3 shows an example of how the federation equipment 24 can make a set of changes to a particular LUN on a particular data storage array 26 of the data storage environment 20 based on specialized queries. FIG. 4 shows another example of how the federation equipment 24 is able to make a set of changes to multiple data storage arrays 26 of the data storage environment 20 based on specialized queries.

As shown in FIG. 3, the federation equipment 24 communicates with multiple data storage arrays 26(1), 26(2), 26(3), . . . of the data storage environment 20. The clouds of the communications array 28 (also see FIG. 1) are omitted in FIG. 3 for simplicity.

By way of example, the data storage array 26(1) is a hybrid array that includes multiple data storage tiers 100 (SSD), 100(SAS), and 100(NL-SAS) (collectively, data storage tiers 100). Each data storage tier 100 includes multiple storage devices (illustrated using disk symbols in FIG. 1).

Along these lines, the storage tier 100(SSD) is formed from SSD storage components, i.e., at least one SSD device (or simply SSD) that provides fast access to non-volatile storage. One should appreciate that such SSD storage is generally faster (i.e., shorter response times when reading and/or writing data) but typically more expensive than hard disk drive (HDD) storage.

Additionally, the storage tier 100(SAS) is formed from SAS magnetic disk drives (e.g., high end HDDs) that provide access to non-volatile storage. One should appreciate that such HDD storage is generally slower (i.e., longer response times when reading and/or writing data) but typically less expensive than SSD storage.

Furthermore, the storage tier 100(NL-SAS) is formed from near line SAS magnetic disk drives. Near line SAS HDDs that form the storage tier 100(NL-SAS) provide lesser performance than HDDs that form the storage tier 100(SAS) but storage that is more cost effective.

It should be understood that the data storage array 26(1) includes three storage tiers 100 by way of example only, and that any of the arrays 26 can include a different number of storage tiers 100, e.g., one, two, four, etc. Moreover, the various storage tiers 100 may differ from each other in a variety of ways. For example, storage tiers 100 may differ in terms of architecture (e.g., single-level cell solid state devices or SSDs, multi-level cell SSDs, magnetic disk, etc.), speed (e.g., 7200 RPM, 10,000 RPM, etc.), usage/adapter category (e.g., SAS, NL-SAS, etc.), storage capacity, power consumption, RAID level, and so on.

It should be further understood that a LUN may reside on a single storage tier 100 or multiple storage tiers 100. For example, the various storage tiers 100 of the array 26(1) may contribute slice locations to heterogeneous pools of storage slices. Along these lines, the array 26(1) provisions a particular LUN 110 with storage slices from that heterogeneous pool. Accordingly, at any particular time, the LUN 110 may store data in storage slices of one tier 100 and other data in storage slices of another tier 100. Moreover, in accordance with a current tiering policy, the array 26(1) may relocate one or more data slices from one tier 100 to another tier 100.

As further shown in FIG. 3, a host computer sends I/O requests 30 to the federation equipment 24. The federation equipment 24 receives I/O requests 30 from the host computer 22 and forwards the I/O requests 30 to the array 26(1) for processing. For write operations, the array 26(1) stores data within the LUN 110. For read operations, the array 26(1) reads data from the LUN 100 and relays that data to the host computer 22.

During such operation, the federation equipment 24 is further able to access detailed information regarding the array 26(1) via communications 120 from the federation equipment 24 to the array 26(1), and communications 122 from the array 26(1) to the federation equipment 24. For example, the federation equipment 24 is able to query the array 26(1) for the particular tiering policy that is applied to the LUN 110. Along these lines, the federation equipment 24 sends a media type query to the array 26(1) which directs the array 26(1) to identify the particular media type or types that form the LUN 110. In response, the array 26(1) provides a media type response indicating the media type or types that form the LUN 110. Along these lines and by way of example, the array 26(1) may respond to the media type query with a particular media type response indicating that the LUN 110 is provisioned with storage from all three storage tiers 100, i.e., from a heterogeneous pool formed from all three storage tiers 100 (illustrated by the LUN 110 extending across all three tiers 100 in FIG. 3).

As another example, with the federation equipment 24 now informed that the LUN 110 is provisioned with slice locations from different tiers 100, the federation equipment 24 can send a tiering policy query to the array 26(1) which directs the array 26(1) to identify the particular tiering policy that the array 26(1) applies to the LUN 110 (e.g., highest available tier, auto-tier, start high then auto-tier, etc.). In response, the array 26(1) provides a tiering policy response indicating the particular tiering policy that the array 26(1) applies to the LUN 110. By way of example, the array 26(1) may respond to the tiering policy query with a particular tiering policy response indicating that the array applies a lowest available tier policy to the LUN 110 (i.e., where data is placed on the lowest available tier 100).

It should be understood that the federation equipment 24 may send commands to the arrays 26 to adjust operation of the arrays 26. To change the current tiering policy that an array 26 applies to a LUN, the federation equipment 24 may send a tiering policy command that directs the array 26 to apply a new tiering policy to the LUN in place of the current tiering policy. For example, suppose that faster response time is required for the LUN 110, the federation equipment 24 may send a tiering policy command that directs the array 26 to apply a highest available tier policy (or some other LUN level policy) to the LUN in place of the lowest available tier policy.

As another example, the federation equipment 24 may send commands to the arrays to include storage locations of certain tiers 100 within a particular storage pool. For example, the federation equipment 24 may convert a homogeneous pool of storage slices from just one tier 100 to a heterogeneous pool of storage slices by provisioning the existing pool with storage slices from another tier 100. As another example, the federation equipment 24 may discontinue allocation of storage slices from a particular tier 100 to a particular pool (e.g., reduce the number of tiers 100 that contribute storage slices to the particular pool), and so on.

As yet another example, the federation equipment 24 may query the array 26(1) for an indication of how full to capacity the LUN 110 has become over time. If the LUN 110 has reached a particular fullness threshold (e.g., 85% full, 90% full, etc.), the federation equipment 24 may automatically send an unmap command to the array 26(1) directing the array 26(1) to unmap no-longer-used storage of the LUN 110 thus freeing up storage slices for reuse. In some arrangements, the federation equipment 24 continuously monitors the array 26(1) for such situations, e.g., event monitoring by periodically comparing reading to predefined thresholds and effectuating a procedure if a particular threshold is reached or crossed. Other examples where the federation equipment 24 queries the arrays 26 for detailed LUN and flash properties and then operates based on that property information are suitable as well.

It should be further understood that the federation equipment 24 may exchange similar communications 120, 122 with other arrays 26 of the data storage environment 20. During such operation, the federation equipment 24 operates as a common access point thus alleviating the need for a human user to connect directly with each array 26 (e.g., login, navigate, query, reconfigure, etc.). Rather, the human user is able to connect with just the federation equipment 24 and access and/or change the LUN-related settings simply from the federation equipment 24. In some arrangements, the human user is able to remotely connect to the federation equipment 24 from an external device, e.g., one of the host computers 22, a separate computer such as a general purpose computer, a tablet, a smart phone, etc.

It should be further understood that the human user is able to obtain other detailed array properties via specialized queries as well as impose other types of control. For example, the human user is able to determine whether the array 26(1) utilizes any of the storage tier 100(SSD) as an extension to its data cache. If not, the human user is able to enable use of a portion of the storage tier 100(SSD) as cache memory. If so, the human user is able to disable use of the storage tier 100(SSD) as cache memory, allocate more memory from the storage tier 100(SSD) to the cache, deallocate memory of the storage tier 100(SSD) from cache, and so on.

FIG. 4 shows an example of how the federation equipment 24 is able to coordinate operation that involves multiple arrays 26 based on specialized queries. For example, suppose that the federation equipment 24 manages data on mirrored LUNs 110 on behalf of a host computer 22. In particular, when the federation equipment 24 receives commands to write data (e.g., I/O requests 30) from the host computer 22, the federation equipment 24 writes the data to a LUN 110(A) on the array 26(A) and to a LUN 110(B) on the array 26(B).

With the ability of the federation equipment 24 to obtain detailed LUN property information from the arrays 26 via specialized queries, the federation equipment 24 is able to perform enhanced operations based on information that would normally be difficult or impossible to gather, analyze, etc. For example, as mentioned earlier, the federation equipment 24 is able to identify the media type (or types) for each LUN 110. Accordingly, the federation equipment 24 is able to determine and compare the media types of the LUNs 110(A) and 110(B).

By way of example, suppose that the federation equipment 24 determines that the LUN 110(A) resides on a tier of the array 26(A) that is exclusively SSD memory. Furthermore, suppose that the federation equipment 24 determines that the LUN 110(B) resides on a tier of the array 26(B) that is exclusively HDD memory and that the array 26(B) does not have any tier of SSD memory. Such a determination may be made by the federation equipment 24 as a common access point rather than by a human operator individually connecting directly to each array 26(A), 26(B).

In such a situation, the federation equipment 24 may further discover that the data storage array 26(C) has SSD memory which is available. Accordingly, the federation equipment 24 is able to transfer the data from the LUN 110(B) to a LUN 110(C) that uses the SSD memory on the array 26(C) (e.g., see the arrow 140 in FIG. 4). Alternatively, the federation equipment 24 may be able to migrate the LUN 110(B) from the array 26(B) to the array 26(C). When such transfer or migration is complete, the entire data storage environment 20 is able to operate more efficiently and effectively since the write operations can now be performed by the federation equipment 24 on SSD memory on both mirrored LUNs 110 on behalf of the host computer 22. Moreover, such operation may be performed transparently without disruption of service. Further details will now be provided with reference to FIG. 5.

Figure 5:
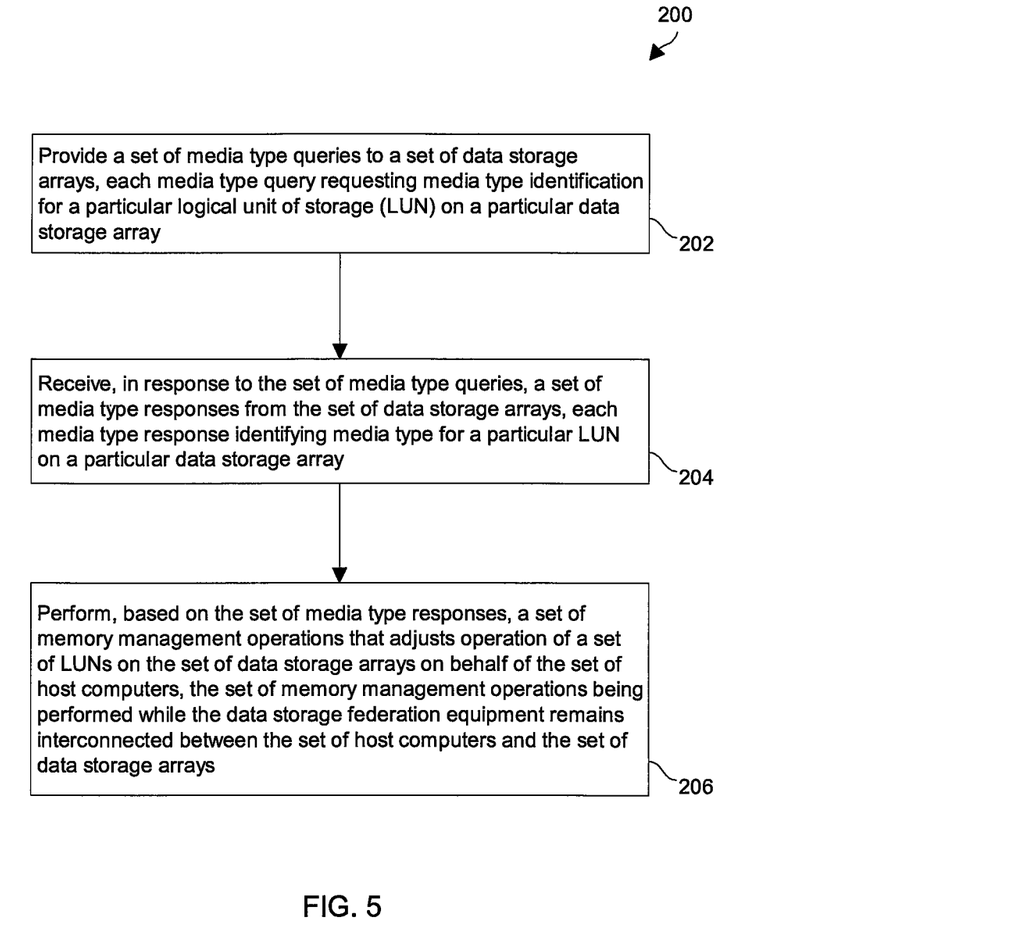
FIG. 5 is a flowchart of a procedure which is performed by the data storage environment of FIG. 1.

FIG. 5 is a flowchart of a procedure 200 for managing a set of data storage arrays on behalf of a set of host computers in accordance with certain example embodiments. Such procedure 200 may be performed by control circuitry of federation equipment 24 (e.g., also see FIG. 1).

At 202, the control circuitry provides a set of media type queries to the set of data storage arrays. Each media type query requests media type identification for a particular logical unit of storage (LUN) on a particular data storage array (also see FIGS. 3 and 4).

At 204, the control circuitry receives, in response to the set of media type queries, a set of media type responses from the set of data storage arrays. Each media type response identifies media type for a particular LUN on a particular data storage array.

At 206, the control circuitry performs, based on the set of media type responses, a set of memory management operations that adjusts operation of a set of LUNs on the set of data storage arrays on behalf of the set of host computers (e.g., based on identified media types for the LUNs). The set of memory management operations is performed while the data storage federation equipment remains interconnected between the set of host computers and the set of data storage arrays.

It should be understood that the procedure 200 may be performed by the federation equipment 24 regarding different host computers 22 and different data storage arrays. Additionally, other LUN and flash property information may be obtained as well such as current tiering policies that the arrays apply to the LUNs, which arrays extend cache memory to portions of SSD tiers, and so on. Moreover, the federation equipment 24 is able to carry out commands to the various arrays to coordinate operation from a common access point within the data storage environment 20, e.g., change tiering policies for LUNs, add tiers to or remove tiers from pools of storage slices, enable or disable use of SSD tiers as cache memory, unmap storage slices automatically in response to triggering of a predefined threshold, and so on.

As mentioned above, an improved technique is directed to managing data storage arrays 26 on behalf of host computers 22 via specialized queries such as media type queries that determine the media type (or types) of various LUNs 110 provided by the data storage arrays 26. Such additional information enables a central access point to provide effective and efficient LUN control remotely from the data storage arrays 26, e.g., from federation equipment 24 that is interconnected between the host computers 22 and the data storage arrays 26, from the host computers 22 themselves, etc. In some arrangements, the federation equipment 24 may be configured to carry out various LUN-related operations automatically, e.g., provide an unmap command to unmap no longer used storage when detecting that remaining LUN capacity has dropped below a predefined threshold. Such central access point operation alleviates the need for a human operator to access multiple data storage arrays 26 individually and directly thus making management of the data storage arrays 26 less burdensome and less prone to error.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

One should appreciate that the above-described techniques do not merely manage data. Rather, the disclosed techniques involve improvements to the technology. Along these lines, with the above-described techniques, the federation equipment 24 is able to access detailed LUN and/or flash properties from the arrays 26 and utilized such information from a central access point, e.g., during storage virtualization, adjustment of LUNs, unmapping to replenish pools, deployment of applications, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

One should appreciate that conventional storage virtualization systems are unable to obtain flash-related properties from arrays and operate based on those flash-related properties. In particular, the conventional storage virtualization systems do not query arrays for such information nor do they provide visibility to such information as a central point of access. Accordingly, if such information is desired, human operators must connect individually and directly to the arrays which is burdensome. Moreover, even with such information in hand, human operators will not make application deployment and configuration decision based on such information since such information was, at best, obtained manually and informally from each array.

However, in contrast to the storage virtualization systems and in accordance with certain embodiments disclosed herein, federation equipment 24 is able to operate as a central point of access and query arrays for flash-related LUN properties as well as other array information. Along these lines, with extra LUN-related knowledge available at federation equipment (e.g., pool information, tiering policy, flash availability, whether SSD is used to extend cache memory, etc.) which is interconnected between host computers and arrays, the federation equipment is able to put such information to use (e.g., issue commands to the array to reconfigure the arrays for various LUNs, verify proper re-configuration, detect events based on comparisons to thresholds and perform procedures, and so on).

Example flash related properties include array storage pool type such as whether the pool of storage locations for a LUN is an all flash memory pool, an all SAS memory pool, an all near line-SAS pool, a hybrid pool, etc. Additionally, in the context of hybrid pools, the flash related properties may further include an indication of the current tiering policy (i.e., which LUN level policy the array is currently applying to the LUN), the percentage of the LUN assigned to each tier, and so on.

In some arrangements, other enhanced operations may be performed. For example, in some embodiments, at least some of this information is made visible to the host computers 22. Additionally, in some embodiments, the information is monitored and used to trigger invocation of certain procedures automatically (e.g., issuance of an unmap command to free up slice locations, adjust or control application deployment, and so on).

It should be understood that such enhanced operations may be performed concurrently with core data center services (e.g., providing local or distributed federation, operating as a single data center, operating as a cluster with synchronous distances, etc.). In particular, the federation equipment 24 may provide mobility (e.g., move and relocate virtual machines (VMs), applications, and data over distance), availability (e.g., create and maintain high-availability storage infrastructure such as by mirroring across locations), and collaboration (e.g., enable concurrent read/write access to data across locations), among other things.

In accordance with some embodiments, the federation equipment facilitates creating objects on LUNs from the array side, by exposing certain LUN properties to the users (e.g., whether the LUN can be auto-tiered, whether the LUN is based on flash disks, etc.). Accordingly, the data storage environment 20 now enjoys improved performance capability by helping users deploy applications specifically and conveniently.

In some embodiments, available properties include tiering policies as well as other flash related properties such as whether a portion of a flash tier is currently used to extend cache memory. Such properties are obtained from via inquiry commands the federation equipment 24 sends to the arrays 26. Such modifications and enhancements are intended to belong to various embodiments of the disclosure.

What is claimed is:

1. In data storage federation equipment that is interconnected between a set of host computers and a set of data storage arrays, a method of managing the set of data storage arrays on behalf of the set of host computers, the method comprising:

provideing a set of media type queries to the set of data storage arrays, each media type query requesting media type identification for a particular logical unit of storage (LUN) on a particular data storage array;

in response to the set of media type queries, receiving a set of media type responses from the set of data storage arrays, each media type response identifying media type for a particular LUN on a particular data storage array;

based on the set of media type responses, performing a set of memory management operations that adjusts operation of a set of LUNs on the set of data storage arrays on behalf of the set of host computers, the set of memory management operations being performed while the data storage federation equipment remains interconnected between the set of host computers and the set of data storage arrays;

sending a first tiering policy query from the data storage federation equipment to a first data storage array to ascertain a current tiering policy that the first data storage array applies to a first LUN on the first data storage array;

sending a second tiering policy query from the data storage federation equipment to a second data storage array to ascertain a current tiering policy that the second data storage array applies to a second LUN on the second data storage array;

providing a first tiering policy command that directs the first data storage array to apply a new tiering policy to the first LUN in place of the current tiering policy that the first data storage array applies to the first LUN; and providing a second tiering policy command that directs the second data storage array to apply a new tiering policy to the second LUN in place of the current tiering policy that the second data storage array applies to the second LUN.

2. A method as in claim 1 wherein providing the set of media type queries to the set of data storage arrays includes:

sending a first media type query from the data storage federation equipment to the first data storage array to question the first data storage array as to whether the first LUN on the first data storage array occupies any solid state drive (SSD) memory and any hard disk drive (HDD) memory, and sending a second media type query from the data storage federation equipment to the second data storage array to question the second data storage array as to whether the second LUN on the second data storage array occupies any SSD memory and any HDD memory.

3. A method as in claim 2 wherein receiving the set of media type responses from the set of data storage arrays includes:

obtaining a first media type response from first data storage array in response to the first media type query, the first media type response indicating whether the first LUN on the first data storage array occupies any SSD memory and any HDD memory, and obtaining a second media type response from second data storage array in response to the second media type query, the second media type response indicating whether the second LUN on the second data storage array occupies any SSD memory and any HDD memory.

4. A method as in claim 3, further comprising:

based on the first media type response, transmitting a first message to a first host computer indicating whether the first LUN on the first data storage array occupies any SSD memory and any HDD memory; and based on the second media type response, transmitting a second message to a second host computer indicating whether the second LUN on the second data storage array occupies any SSD memory and any HDD memory.

5. A method as in claim 3 wherein the first media type response indicates that the first LUN on the first data storage array occupies SSD memory and HDD memory; and wherein the second media type response indicates that the second LUN on the second data storage array occupies SSD memory and HDD memory.

6. A method as in claim 1, further comprising:

prior to providing the first tiering policy command, receiving a first tiering policy instruction from a first host computer, the first tiering policy instruction directing the data storage federation equipment to provide the first tiering policy command to the first data storage array, and prior to providing the second tiering policy command, receiving a second tiering policy instruction from a second host computer, the second tiering policy instruction directing the data storage federation equipment to provide the second tiering policy command to the second data storage array.

7. A method as in claim 3 wherein the first media type response indicates that the first LUN on the first data storage array occupies SSD memory;

wherein the second media type response indicates that the second LUN on the second data storage array occupies SSD memory; and wherein the method further comprises:

sending a first SSD caching query from the data storage federation equipment to the first data storage array to ascertain whether the first data storage array is currently using a portion of flash memory as an extension of a cache that buffers data for the first LUN, and sending a second SSD caching query from the data storage federation equipment to the second data storage array to ascertain whether the second data storage array is currently using a portion of flash memory as an extension of a cache that buffers data for the second LUN.

8. A method as in claim 7 wherein a first SSD caching response to the first SSD caching query indicates that the first data storage array is currently not using a portion of flash memory as an extension of a cache that buffers data for the first LUN;

wherein a second SSD caching response to the second SSD caching query indicates that the second data storage array is currently not using a portion of flash memory as an extension of a cache that buffers data for the second LUN; and wherein the method further comprises:

sending a first SSD caching command from the data storage federation equipment to the first data storage array that directs the first data storage array to use a portion of flash memory as an extension of a cache that buffers data for the first LUN, and sending a second SSD caching command from the data storage federation equipment to the second data storage array that directs the second data storage array to use a portion of flash memory as an extension of a cache that buffers data for the second LUN.

9. A method as in claim 8, further comprising:

based on the first SSD caching response, transmitting a first message to a first host computer indicating that the first data storage array is currently not using a portion of flash memory as an extension of the cache that buffers data for the first LUN, prior to sending the first SSD caching command, receiving a first SSD caching instruction from the first host computer, the first SSD caching instruction directing the data storage federation equipment to provide the first tiering policy command to the first data storage array, based on the second SSD caching response, transmitting a second message to a second host computer indicating that the second data storage array is currently not using a portion of flash memory as an extension of the cache that buffers data for the first LUN, and prior to sending the second SSD caching command, receiving a second SSD caching instruction from the second host computer, the second SSD caching instruction directing the data storage federation equipment to provide the second tiering policy command to the second data storage array.

10. A method as in claim 1 wherein a first media type response indicates that the first LUN on the first data storage array is a thinly provisioned LUN;
wherein a second media type response indicates that the second LUN on the second data storage array is a thinly provisioned LUN; and
wherein the method further comprises:
based on the first media type response, sending a first unmap command from the data storage federation equipment to the first data storage array to unmap unused storage slices from the first LUN and return the unused storage slices back to a pool of free storage slices on the first data storage array, and
based on the second media type response, sending a second unmap command from the data storage federation equipment to the second data storage array to unmap unused storage slices from the second LUN and return the unused storage slices back to a pool of free storage slices on the second data storage array.

11. A method as in claim 10, further comprising:
based on the first media type response, transmitting a first message to a first host computer indicating that the first LUN on the first data storage array is a thinly provisioned LUN,
prior to sending the first unmap command, receiving a first unmap instruction from the first host computer, the first unmap instruction directing the data storage federation equipment to provide the first unmap command to the first data storage array,
based on the second media type response, transmitting a second message to a second host computer indicating that the second LUN on the second data storage array is a thinly provisioned LUN, and
prior to sending the second unmap command, receiving a second unmap instruction from the second host computer, the first unmap instruction directing the data storage federation equipment to provide the second unmap command to the second data storage array.

12. A method as in claim 10, further comprising:
based on the first media type response, performing a first capacity operation which determines whether an amount of remaining capacity of the first LUN is less than a first predefined capacity threshold, the first unmap command being sent to the first data storage array in response to a result of the first capacity operation indicating that the amount of remaining capacity of the first LUN is less than the first predefined threshold, and
based on the second media type response, performing a second capacity operation which determines whether an amount of remaining capacity of the second LUN is less than a second predefined capacity threshold, the second unmap command being sent to the second data storage array in response to a result of the second capacity operation indicating that the amount of remaining capacity of the second LUN is less than the second predefined threshold.

13. A method as in claim 1 wherein the data storage federation equipment includes (i) cache memory and (ii) a communications interface that is constructed and arranged to communicate with the set of host computers and the set of data storage arrays via a storage area network (SAN)-based protocol; and
wherein method further comprises:
caching, through the communications interface and within the cache memory, host input/output (I/O) requests en route via the SAN-based protocol from the set of host computers to the set of data storage arrays.

14. Data storage equipment, comprising:
a host interface operative to communicate with a set of host computers;
a storage interface operative to communicate with a set of data storage arrays;
memory; and
control circuitry coupled to the host interface, the storage interface, and the memory, wherein the memory stores instructions which, when carried out by the control circuitry, cause the control circuitry to:
provide a set of media type queries to the set of data storage arrays through the storage interface, each media type query requesting media type identification for a particular logical unit of storage (LUN) on a particular data storage array,
in response to the set of media type queries, receive a set of media type responses from the set of data storage arrays through the storage interface, each media type response identifying media type for a particular LUN on a particular data storage array,
based on the set of media type responses, perform a set of memory management operations that adjusts operation of a set of LUNs on the set of data storage arrays on behalf of the set of host computers, the set of memory management operations being performed while the data storage federation equipment remains interconnected between the set of host computers through the host interface and the set of data storage arrays through the storage interface to process host input/output (I/O) requests;
send a first tiering policy query from the data storage federation equipment to a first data storage array to ascertain a current tiering policy that the first data storage array applies to a first LUN on the first data storage array,
send a second tiering policy query from the data storage federation equipment to a second data storage array to ascertain a current tiering policy that the second data storage array applies to a second LUN on the second data storage array;
provide a first tiering policy command that directs the first data storage array to apply a new tiering policy to the first LUN in place of the current tiering policy that the first data storage array applies to the first LUN; and
provide a second tiering policy command that directs the second data storage array to apply a new tiering policy to the second LUN in place of the current tiering policy that the second data storage array applies to the second LUN.

15. A computer program product having a non-transitory computer readable medium which stores a set of instructions to manage a set of data storage arrays on behalf of a set of host computers; the set of instructions, when carried out by computerized circuitry, causing the computerized circuitry to perform a method of:
providing a set of media type queries to the set of data storage arrays, each media type query requesting media type identification for a particular logical unit of storage (LUN) on a particular data storage array;
in response to the set of media type queries, receiving a set of media type responses from the set of data storage arrays, each media type response identifying media type for a particular LUN on a particular data storage array;

based on the set of media type responses, performing a set of memory management operations that adjusts operation of a set of LUNs on the set of data storage arrays on behalf of the set of host computers, the set of memory management operations being performed while the data storage federation equipment remains interconnected between the set of host computers and the set of data storage arrays to process host input/output (I/O) requests;

sending a first tiering policy query from the data storage federation equipment to a first data storage array to ascertain a current tiering policy that the first data storage array applies to a first LUN on the first data storage array;

sending a second tiering policy query from the data storage federation equipment to a second data storage array to ascertain a current tiering policy that the second data storage array applies to a second LUN on the second data storage array;

providing a first tiering policy command that directs the first data storage array to apply a new tiering policy to the first LUN in place of the current tiering policy that the first data storage array applies to the first LUN; and providing a second tiering policy command that directs the second data storage array to apply a new tiering policy to the second LUN in place of the current tiering policy that the second data storage array applies to the second LUN.

16. Data storage equipment as in claim 14 wherein the instructions, when carried out by the control circuitry, further cause the control circuitry to:

send a first SSD caching query from the data storage federation equipment to the first data storage array to ascertain whether the first data storage array is currently using a portion of flash memory as an extension of a cache that buffers data for the first LUN, and send a second SSD caching query from the data storage federation equipment to the second data storage array to ascertain whether the second data storage array is currently using a portion of flash memory as an extension of a cache that buffers data for the second LUN;

wherein a first SSD caching response to the first SSD caching query indicates that the first data storage array is currently not using a portion of flash memory as an extension of a cache that buffers data for the first LUN;

wherein a second SSD caching response to the second SSD caching query indicates that the second data storage array is currently not using a portion of flash memory as an extension of a cache that buffers data for the second LUN; and wherein the instructions, when carried out by the control circuitry, further cause the control circuitry to:

send a first SSD caching command from the data storage federation equipment to the first data storage array that directs the first data storage array to use a portion of flash memory as an extension of a cache that buffers data for the first LUN, and send a second SSD caching command from the data storage federation equipment to the second data storage array that directs the second data storage array to use a portion of flash memory as an extension of a cache that buffers data for the second LUN.

17. A computer program product as in claim 15 wherein the method further includes:

sending a first SSD caching query from the data storage federation equipment to the first data storage array to ascertain whether the first data storage array is currently using a portion of flash memory as an extension of a cache that buffers data for the first LUN, and sending a second SSD caching query from the data storage federation equipment to the second data storage array to ascertain whether the second data storage array is currently using a portion of flash memory as an extension of a cache that buffers data for the second LUN;

wherein a first SSD caching response to the first SSD caching query indicates that the first data storage array is currently not using a portion of flash memory as an extension of a cache that buffers data for the first LUN;

wherein a second SSD caching response to the second SSD caching query indicates that the second data storage array is currently not using a portion of flash memory as an extension of a cache that buffers data for the second LUN; and wherein the method further includes:

sending a first SSD caching command from the data storage federation equipment to the first data storage array that directs the first data storage array to use a portion of flash memory as an extension of a cache that buffers data for the first LUN, and sending a second SSD caching command from the data storage federation equipment to the second data storage array that directs the second data storage array to use a portion of flash memory as an extension of a cache that buffers data for the second LUN.

18. In data storage federation equipment that is interconnected between a set of host computers and a set of data storage arrays, a method of managing the set of data storage arrays on behalf of the set of host computers, the method comprising:

providing a set of media type queries to the set of data storage arrays, each media type query requesting media type identification for a particular logical unit of storage (LUN) on a particular data storage array;

in response to the set of media type queries, receiving a set of media type responses from the set of data storage arrays, each media type response identifying media type for a particular LUN on a particular data storage array;

based on the set of media type responses, performing a set of memory management operations that adjusts operation of a set of LUNs on the set of data storage arrays on behalf of the set of host computers, the set of memory management operations being performed while the data storage federation equipment remains interconnected between the set of host computers and the set of data storage arrays;

sending a first SSD caching query from the data storage federation equipment to a first data storage array to ascertain whether the first data storage array is currently using a portion of flash memory as an extension of a cache that buffers data for a first LUN;

sending a second SSD caching query from the data storage federation equipment to a second data storage array to ascertain whether the second data storage array is currently using a portion of flash memory as an extension of a cache that buffers data for a second LUN;

wherein a first SSD caching response to the first SSD caching query indicates that the first data storage array is currently not using a portion of flash memory as an extension of a cache that buffers data for the first LUN;
wherein a second SSD caching response to the second SSD caching query indicates that the second data storage array is currently not using a portion of flash memory as an extension of a cache that buffers data for the second LUN; and
wherein the method further comprises:
sending a first SSD caching command from the data storage federation equipment to the first data storage array that directs the first data storage array to use a portion of flash memory as an extension of a cache that buffers data for the first LUN, and
sending a second SSD caching command from the data storage federation equipment to the second data storage array that directs the second data storage array to use a portion of flash memory as an extension of a cache that buffers data for the second LUN.

19. Data storage equipment, comprising:
a host interface operative to communicate with a set of host computers;
a storage interface operative to communicate with a set of data storage arrays;
memory; and
control circuitry coupled to the host interface, the storage interface, and the memory, wherein the memory stores instructions which, when carried out by the control circuitry, cause the control circuitry to:
provide a set of media type queries to the set of data storage arrays through the storage interface, each media type query requesting media type identification for a particular logical unit of storage (LUN) on a particular data storage array,
in response to the set of media type queries, receive a set of media type responses from the set of data storage arrays through the storage interface, each media type response identifying media type for a particular LUN on a particular data storage array,
based on the set of media type responses, perform a set of memory management operations that adjusts operation of a set of LUNs on the set of data storage arrays on behalf of the set of host computers, the set of memory management operations being performed while the data storage federation equipment remains interconnected between the set of host computers through the host interface and the set of data storage arrays through the storage interface to process host input/output (I/O) requests;
send a first SSD caching query from the data storage federation equipment to a first data storage array to ascertain whether the first data storage array is currently using a portion of flash memory as an extension of a cache that buffers data for a first LUN;
send a second SSD caching query from the data storage federation equipment to a second data storage array to ascertain whether the second data storage array is currently using a portion of flash memory as an extension of a cache that buffers data for a second LUN;
wherein a first SSD caching response to the first SSD caching query indicates that the first data storage array is currently not using a portion of flash memory as an extension of a cache that buffers data for the first LUN;
wherein a second SSD caching response to the second SSD caching query indicates that the second data storage array is currently not using a portion of flash memory as an extension of a cache that buffers data for the second LUN; and
wherein the instructions, when carried out by the control circuitry, further cause the control circuitry to:
send a first SSD caching command from the data storage federation equipment to the first data storage array that directs the first data storage array to use a portion of flash memory as an extension of a cache that buffers data for the first LUN, and
send a second SSD caching command from the data storage federation equipment to the second data storage array that directs the second data storage array to use a portion of flash memory as an extension of a cache that buffers data for the second LUN.

20. A computer program product having a non-transitory computer readable medium which stores a set of instructions to manage a set of data storage arrays on behalf of a set of host computers; the set of instructions, when carried out by computerized circuitry, causing the computerized circuitry to perform a method of:
providing a set of media type queries to the set of data storage arrays, each media type query requesting media type identification for a particular logical unit of storage (LUN) on a particular data storage array;
in response to the set of media type queries, receiving a set of media type responses from the set of data storage arrays, each media type response identifying media type for a particular LUN on a particular data storage array;
based on the set of media type responses, performing a set of memory management operations that adjusts operation of a set of LUNs on the set of data storage arrays on behalf of the set of host computers, the set of memory management operations being performed while the data storage federation equipment remains interconnected between the set of host computers and the set of data storage arrays to process host input/output (I/O) requests;
sending a first SSD caching query from the data storage federation equipment to a first data storage array to ascertain whether the first data storage array is currently using a portion of flash memory as an extension of a cache that buffers data for a first LUN;
sending a second SSD caching query from the data storage federation equipment to a second data storage array to ascertain whether the second data storage array is currently using a portion of flash memory as an extension of a cache that buffers data for a second LUN;
wherein a first SSD caching response to the first SSD caching query indicates that the first data storage array is currently not using a portion of flash memory as an extension of a cache that buffers data for the first LUN;
wherein a second SSD caching response to the second SSD caching query indicates that the second data storage array is currently not using a portion of flash memory as an extension of a cache that buffers data for the second LUN; and
wherein the method further comprises:
sending a first SSD caching command from the data storage federation equipment to the first data storage array that directs the first data storage array to use a portion of flash memory as an extension of a cache that buffers data for the first LUN, and
sending a second SSD caching command from the data storage federation equipment to the second data storage array that directs the second data storage array to use a portion of flash memory as an extension of a cache that buffers data for the second LUN.

* * * * *